FIG_1

INVENTOR
PETER J. BILY
BY *Hans G. Hoffmeister*
ATTORNEY

April 18, 1961 P. J. BILY 2,980,150
FLUID CONVEYING APPARATUS
Filed Nov. 28, 1956 8 Sheets-Sheet 3

INVENTOR
PETER J. BILY
BY Hans G. Hoffmeister
ATTORNEY

April 18, 1961 P. J. BILY 2,980,150
FLUID CONVEYING APPARATUS
Filed Nov. 28, 1956 8 Sheets-Sheet 4

FIG_4

INVENTOR
PETER J. BILY
BY Hans G. Hoffmeister
ATTORNEY April 18, 1961 P. J. BILY 2,980,150
FLUID CONVEYING APPARATUS
Filed Nov. 28, 1956 8 Sheets-Sheet 6

INVENTOR
PETER J. BILY
BY Hans G. Hoffmeister
ATTORNEY

United States Patent Office 2,980,150
Patented Apr. 18, 1961

2,980,150

FLUID CONVEYING APPARATUS

Peter J. Bily, Brea, Calif., assignor, by mesne assignments, to Chiksan Company, Brea, Calif., a corporation of California Filed Nov. 23, 1956, Ser. No. 624,712

24 Claims. (Cl. 141—387)

The present invention relates to apparatus for conveying fluids between two stations which are movable with respect to one another and more particularly appertains to fluid conveying apparatus especially adapted for use in loading and unloading marine tankers.

This application is a continuation-in-part of my co-pending application, Serial No. 554,895, filed December 22, 1955, now abandoned.

Movement such as that which is apt to be experienced by a floating ship during loading and unloading requires that apparatus connecting the ship to its dock be flexible. It has been common practice to employ heavy flexible rubber hoses of large diameter for loading and unloading tankers. However, such hoses are inherently unwieldy and require considerable manhandling to manipulate them while being connected and disconnected as well as considerable equipment to support the hose while the hose is being moved to and from operating position and while loading or unloading is in progress. Although it has been proposed to use articulated hoses formed of swivelly interconnected metallic sections, no satisfactory means has been found for handling such hoses.

An object of the present invention is to provide an improved fluid conveying apparatus.

Another object is to provide improved apparatus for use in conveying fluids between two relatively movable stations.

Another object is to provide a hose formed of a plurality of relatively inflexible and pivotally interconnected sections which are constructed and supported in a manner enabling them to readily accommodate themselves to the movements of a floating ship with respect to a loading dock while fluid is being transported by the hose between the dock and the ship.

Another object is to provide fluid conveying apparatus which includes an articulated hose supported by a boom for movement into position to establish interconnection between a conduit on a loading platform or dock and a conduit on a floating ship.

Another object is to provide a boom which supports a hose or hose assembly for connection between two relatively movable conduits, wherein forces tending to resist movement of the boom and hose to and from loading position are effectively counterbalanced.

Another object is to provide a hose assembly which is swingable over a wide arc between operative and stowed positions upon opposite sides of a neutral position, which assembly is effectively counterbalanced in any position throughout its entire range of movement.

Another object is to provide a counterbalanced boom and hose assembly including counterweights so positioned relatively to the assembly as not to interfere with the swinging thereof.

Another object is to provide power driven apparatus for maneuvering the fluid-conveying apparatus to and from operating position.

Another object is to provide fluid conveying apparatus comprising a plurality of separate units each of which includes an articulated hose and a supporting boom therefor, and power means for maneuvering any selected unit into and out of operating position.

These and other objects and advantages of the present invention will become apparent from the following description and the accompanying drawings in which.

The fluid conveying apparatus of the present invention (Figs. 2, 7 and 9) includes an articulated hose or hose assembly A comprising swivelly interconnected rigid inner, central and outer sections B, C and D, respectively. The hose assembly is supported by a boom E for movement into and out of fluid conveying connection with respect to fluid delivering and fluid receiving means such as conduits F and G, respectively (Figs. 7–10), that are movable with relation to each other and between which it is desired to convey fluids. One such conduit G is located on a floating ship H, such as a marine tanker, and the other conduit F is located on a loading dock I or the like, and a base J for supporting the hose assembly is mounted on the dock. If desired, however, the arrangement may be reversed, i.e., the entire unit including the hose assembly A, the boom E, base J and conduit F may be located on the ship H while the conduit G may be located on the dock I.

The hose assembly A is supported by the base J for both swinging movement in a vertical path and rotation relative to the base about a vertical axis. The hose assembly, hereinafter also called the hose, is connected at its inner end B' with the conduit F and is suspended from the boom E for movement thereby into a position for connection of its outer end D' to the conduit G. The boom E and hose assembly A are so constructed and mounted that when they are in the intermediate position illustrated in Figs. 7 and 12, they are in neutral equilibrium, and means are provided for counterbalancing substantially all of any otherwise unbalanced forces which develop as a consequence of displacement of the boom and hose assembly in either direction from the intermediate position. Thus, the hose assembly is easily and rapidly movable in either direction between operative and inoperative positions without requiring excessive manhandling.

It is intended that one end of the hose assembly A shall remain connected to the conduit F, and power means K, as well as suitable controls L therefor, are provided whereby a single operator can quickly and accurately manipulate the boom E in a manner causing the same to carry the hose assembly A either to or from an operative position wherein the other end D' of the hose can easily be connected to or disconnected from the conduit G.

Figure 1:
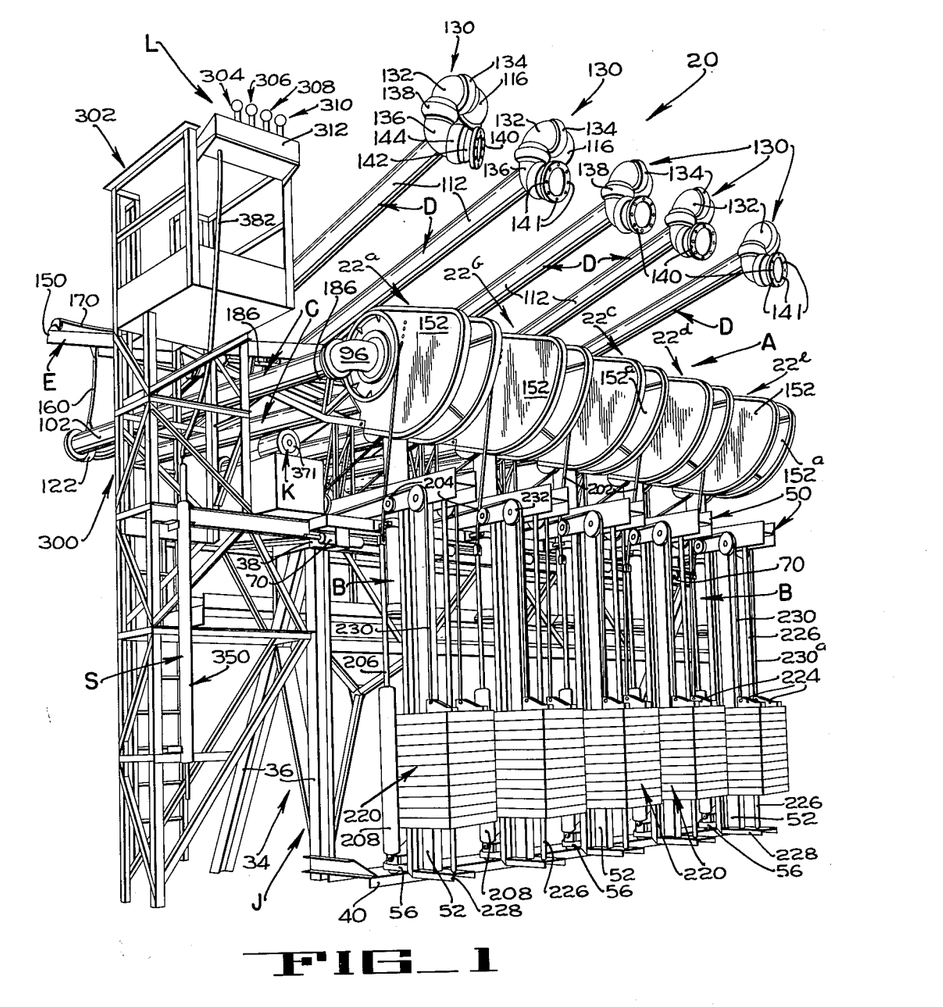
Fig. 1 is a perspective of a multi-unit fluid-conveying apparatus embodying the present invention, all hydraulic lines being omitted.
Figure 15:
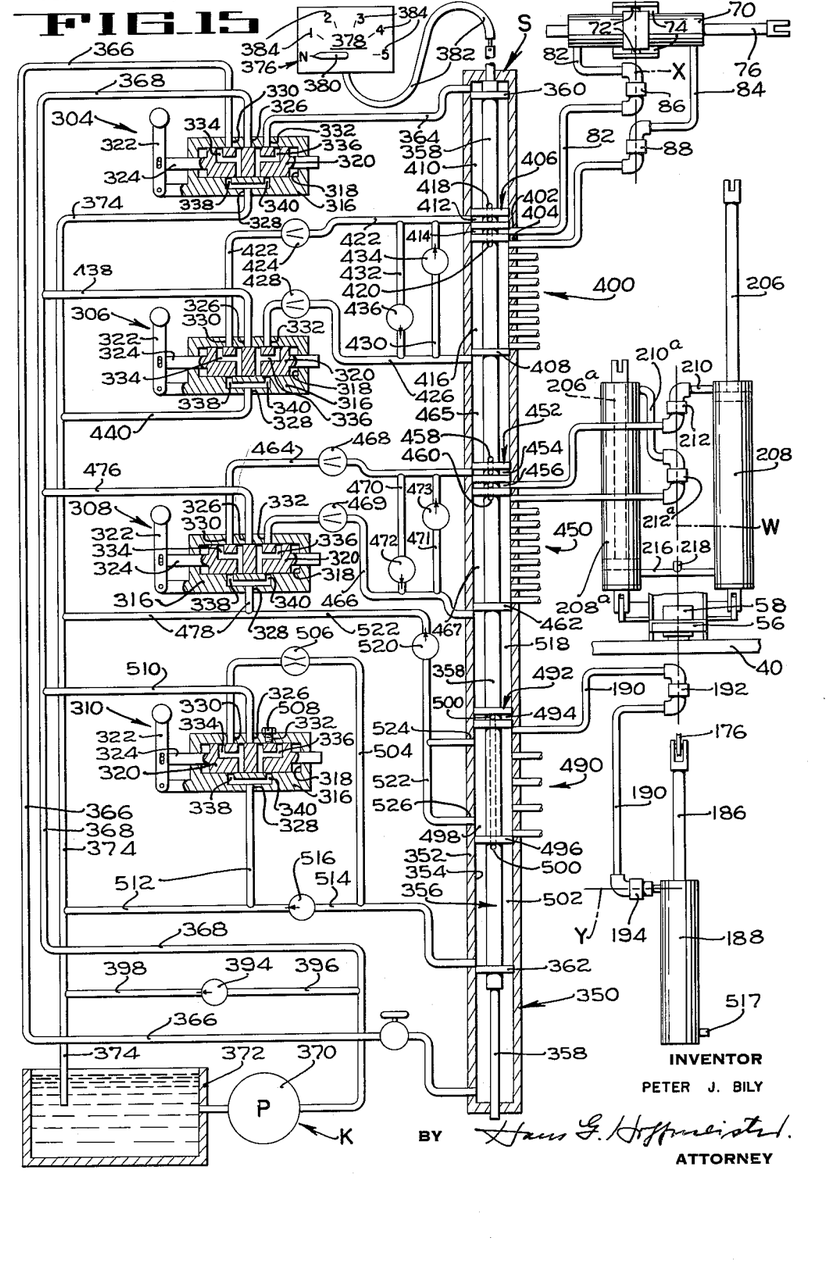
Fig. 15 is a diagram of the hydraulic system for operating the several units of the fluid-conveying apparatus of Fig. 1.

A single boom E and hose assembly A (Fig. 2) or a plurality of booms E and hose assemblies A (Fig. 1) may be employed in a single installation and controlled by a single control mechanism L (Figs. 1 and 15). A suitable selector device S is used to determine which of the several boom and hose assemblies will be responsive to the control mechanism at any one time.

The power and control mechanism of such a multi-unit apparatus is so arranged that if the controls L remain connected to a unit after the hose A of the unit has been maneuvered into operative position, the said unit will be held by the power mechanism in the operative position against accidental or inadvertent displacement until connection between the unit and the control L is discontinued. In spite of this self-locking feature of the apparatus, however, the mechanism holding a unit in selected position while the control L is connected thereto is yieldable in response to forces imposed thereupon in excess of a predetermined safe magnitude, so as to permit the apparatus to adjust itself to compensate for movement of one of the conduits F and G with respect to the other conduit while the hose assembly A of the unit provides fluid conveying interconnection between the conduits.

On the other hand, when the control L is disconnected from a unit after the hose A has been connected to the ship's conduit G, the various parts of the apparatus are free to move with respect to each other so that the boom E and hose A can adapt themselves to movements of the ship H relative to the dock I with no appreciable resistance.

Figure 2:
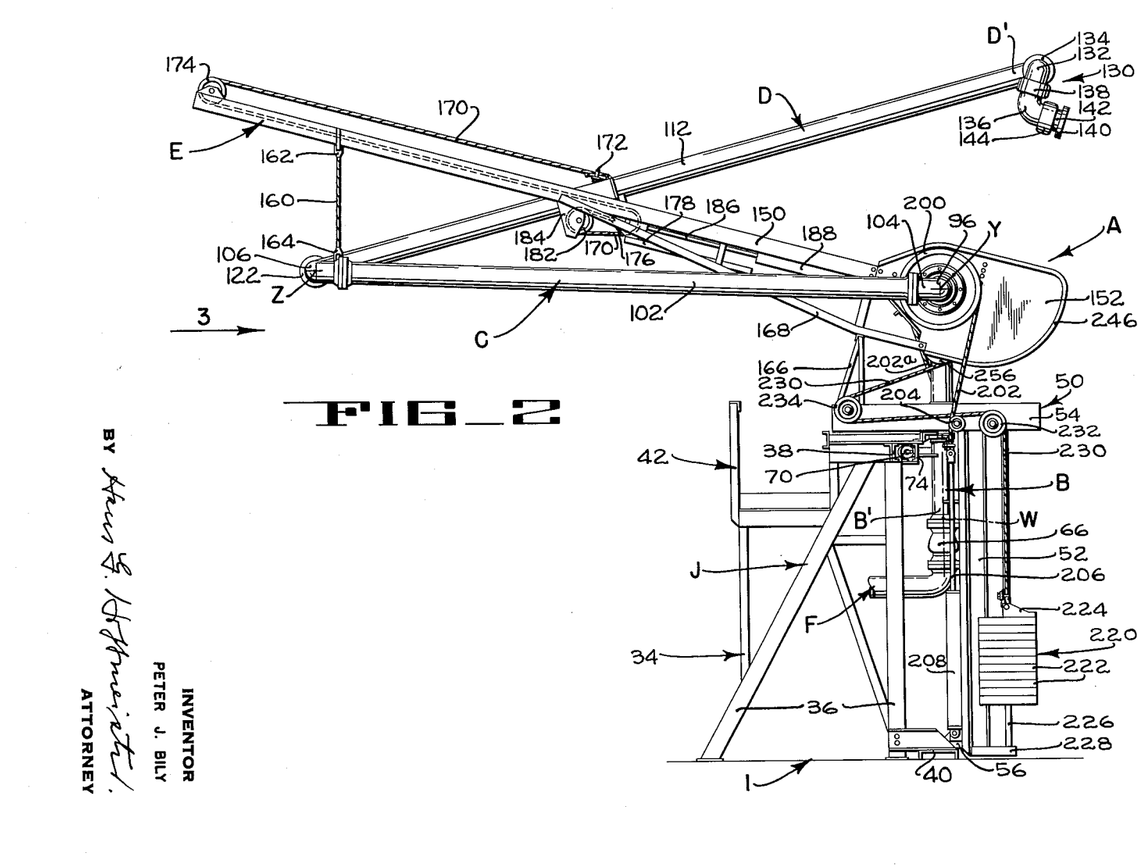
Fig. 2 is a side elevation of one of the units of the fluid-conveying apparatus of Fig. 1.
Figures 3, 5, 6:
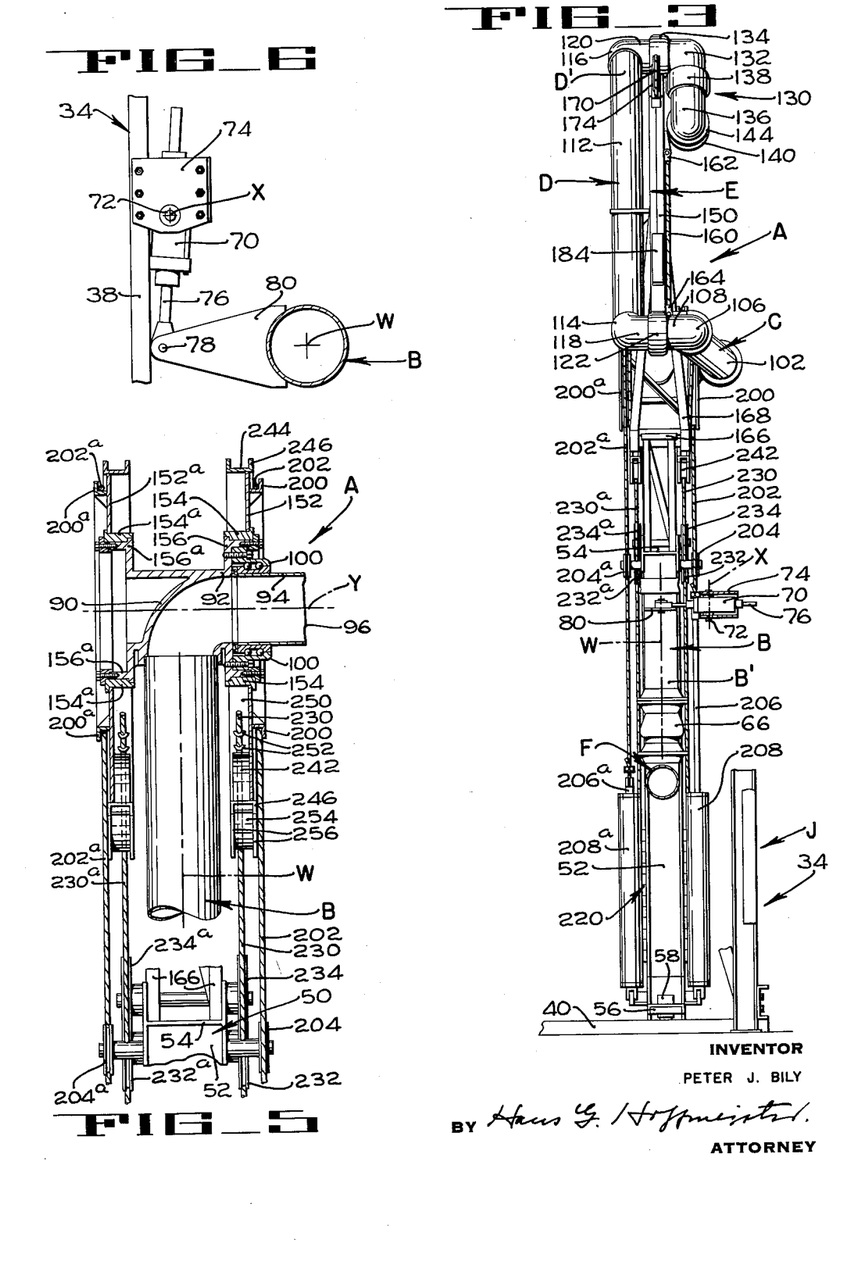
Fig. 3 is a rear elevation of the fluid-conveying unit of Fig. 2 viewed in the direction of arrow 3 of Figure 2.
Fig. 5 is a vertical section taken along lines 5—5 of Fig. 4.
Fig. 6 is a horizontal section taken along lines 6—6 of Fig. 4.

Referring now more particularly to the drawings, and especially Fig. 1, a multi-unit apparatus 20 has been disclosed including five boom and hose assemblies 22a, 22b, 22c, 22d, and 22e, respectively, which will be referred to collectively herein as the units 22 (Figs. 1 and 2). Each unit 22 comprises a fluid tight hose or hose assembly A and a power operated boom E for maneuvering the hose A between a retracted position (Figs. 1 and 2) and an operative position (Figs. 9 and 10) wherein the hose A is adapted to be coupled to a conduit G on a ship H moored to the dock I on which the apparatus 20 of the invention is installed. All of the units 22 are carried by a common base J (Fig. 1), a rigid frame 34 (Fig. 2) erected upon the dock I and comprising spaced apart end members 36 of substantially A-shaped form and interconnected by upper and lower beams 38 and 40, respectively. The frame 34 also includes suitable cross bracing for increasing the strength and rigidity of the frame, as well as a platform 42 from which an attendant can inspect and service all of the several units 22.

The units 22 are mounted in side-by-side, spaced apart relation on the frame 34 (Fig. 1); and since they are of identical construction, it will suffice for the purpose of the present disclosure to describe but one of them. It should also be noted that throughout the drawings like reference numerals are used to designate like parts.

A unit 22 (Figs. 2-5) comprises a T-shaped carriage 50 mounted on the frame 34 for pivotal movement about a vertical axis W. The frame includes a stem, or upright member 52 and a cross arm 54 rigid with the upper end of the stem. A foot plate 56 rigid with the lower end of the stem 52 is pivoted on and supported by a thrust bearing 58 that is mounted on the lower beam 40 of the frame 34. The innermost section B of the hose assembly A is in the form of a vertical pipe which extends through and is rigidly secured to the cross arm 54; and a sleeve bearing 62, in vertical axial alignment with the thrust bearing 58 and carried by a bracket 64 that is rigid with the upper beam 38 of the frame 34, embraces the pipe B to retain the pipe and the carriage 50 erect and to permit them to partake of pivotal movement about the vertical axis W of the bearings 58 and 62.

To permit the pipe B to turn about its vertical axis W (Figs. 5 and 6) and thus to permit the entire unit 22 to turn, the pipe B is provided at its lower end with a swivel joint 66 (Figs. 2 and 3) which establishes permanent but flexible fluid-conducting connection with the stationary conduit F that communicates with a source of fluid to be loaded into the tanker H or with a suitable receptacle to receive fluid from the tanker H, depending upon whether the tanker is to be loaded or unloaded at the dock I.

Means are provided for turning the unit 22 about the vertical axis W. A double acting horizontally disposed hydraulic cylinder 70 (Figs. 1, 2, 4, 5, 6, and 15) is mounted for pivotal movement about a vertical axis X (Figs. 4, 6, and 15) by vertical trunnions 72 (Figs. 4 and 6) in a bracket 74 that is rigidly secured to the upper beam 38 of the stationary frame 34. The plunger rod 76 (Fig. 6) of the hydraulic cylinder 70 is connected by a pivot pin 78 ot a crank arm 80 rigid with and projecting radially from the vertical pipe B. Hydraulic lines 82 and 84 (Fig. 15) of suitable tubing and including swivel joints 86 and 88, respectively, both of which are mounted in coaxial alignment with each other and the trunnions 72, communicate with the inner and outer ends, respectively, of the cylinder 70, so that by connecting the line 82 to a source of hydraulic fluid under pressure, and by relieving pressure within the line 84, the plunger 76 can be forced outward, turning the entire unit 22 in a counterclockwise direction (Fig. 6) about the vertical axis W. Turning of the unit 22 in the opposite direction can be effected by relieving pressure within the line 82 and supplying fluid under pressure to the line 84. The pivotal mounting of the cylinder 70 by the trunnions 72 permits the cylinder 70 to accommodate itself to the arcuate path followed by the crankpin 78 as the unit 22 turns about the axis W.

The swivel joints 86 and 88 permit flexure of the lines 82 and 84 as the cylinder 70 pivots about the axis of the trunnions 72 in response to rotary movement of the unit 22 about the vertical axis W.

A 90° elbow 90 (Fig. 5) is welded to the upper end of the pipe B with the horizontal leg 92 projecting laterally to establish communication between the vertical pipe B and a horizontal laterally projecting leg 94 of another 90° elbow 96 (Figs. 1, 2, 4 and 5) which constitutes a part of the second section C of the hose assembly A. The two elbows 90 and 96 are interconnected by a swivel joint 100 (Fig. 5) that maintains fluid-conducting connection between the first and second sections B and C (Fig. 5) of the hose assembly A and permits pivoted movement of the section C about a horizontal axis Y (Figs. 2, 4, 5 and 7-14) and with relation to the section B. The second section C also includes an elongated metal tube 102 that is straight save for a slight lateral offset (see Fig. 3) and which is rigidly secured to the other leg 104 (Figs. 1 and 5) of the elbow 96.

The second section C of the hose assembly A terminates at its outer end in an elbow 106 (Figs. 2 and 3) so secured to the elongated tube 102 that the outer leg 108 of the elbow 106 is parallel to the leg 94 of the elbow 96, both of which are horizontal at all times.

The third section D (Fig. 3) of the hose assembly A is similar to the second section C in that it includes an elongated metal tube 112 having elbows 114 and 116 rigidly secured to the ends of the tube 112 with their laterally projecting legs 118 and 120 respectively, parallel to each other. The leg 118 of the elbow 114 at the inner end of the tube 112 is connected to the leg 108 of the elbow 106 of the second hose section C by a swivel joint 122 that maintains fluid-conducting communication between the sections C and D of the hose A, and permits pivotal movement of the section D about a horizontal axis and relative to the section C.

The third hose section D carries at its outer end a universally swivelled coupling element 130 comprising an elbow 132 pivotally connected to the horizontal leg 120 of the elbow 116 by a swivel joint 134, an elbow 136 connected to the elbow 132 by a swivel joint 138, and an attaching flange 140 (Fig. 2) connected to the elbow 136 by a short nipple 142 and swivel joint 144. Thus, the coupler 130 provides means for presenting the attaching flange 140 to the standard deck flange 146 (Figs. 7–10) provided at the end of the hereinbefore mentioned conduit G that communicates with one or more tanks (not shown) of a marine tanker H. The swivel joint 144 permits rotation of the flange 140 about its central axis so that upon being presented to the deck flange 146, the bolt holes 141 (Fig. 1) of the flange 140 can readily be brought into registry with those of the deck flange 146, thus permitting connection of the outer end of the articulated hose A to the conduit G aboard the tanker H by bolts 143 (Fig. 10) in a manner establishing fluid-conducting communication between the conduit F on the dock I and the conduit G aboard the tanker.

The boom E for handling the hose A comprises a rigid beam 150 and a pair of transversely spaced plates 152, 152a (Figs. 2, 4 and 5) rigid therewith. The two plates are in vertical parallel planes and cooperate with each other to form a longitudinal extension of the beam 150. Annular bearing members 154 and 154a are welded to the plates 152 and 152a, respectively, in coaxial alignment with each other and with their common axis at right angles to the longitudinal axis of the beam 150 and spaced approximately one-third the length of the plates from the ends of the plates from which the beam 150 projects. The bearing members 154, 154a are rotatably engaged upon coaxial inner bearing members 156 and 156a, respectively, which are rigidly supported by the elbow 90 at the upper end of the first hose section B with their common axis coinciding with the axis Y. Thus, the bearing members 156 and 156a provide trunnions that support the beam 150 upon the first hose section B for movement therewith about the vertical axis W thereof, and for pivotal movement independently of the second hose section C but about the horizontal axis Y.

The outer end of the intermediate hose section C is connected to the boom E by a short length of cable 160 (Figs. 1, 2 and 7–10) that is attached at its ends to the boom E and hose section C by eyes 162 and 164, respectively (Fig. 2). The cable 160 limits movement of the hose section C downward from the boom E when the latter is in its fully retracted position (Fig. 2) in which the boom is supported by a bracket 166 (Figs. 2 and 4) upstanding from the after end of the cross arm 54 in position to be engaged by bracing 168 with which the boom E is provided. When the boom E is turned in clockwise direction, as viewed in Fig. 2, to any position forward of the vertical, the hose section C can swing toward the boom (see Fig. 10) until the swivel joint 122 engages the same, provided a cable 170 connecting the outer hose section D to the boom E is slacked off sufficiently.

The cable 170 is secured to the hose section D by an eye 172 fastened to the section D intermediate the ends thereof, and is reeved through a pulley 174 at the outer end of the boom, from which the cable 170 passes around a traveling pulley 176 that is guided for movement longitudinally of the boom by opposed tracks 178 rigidly secured thereto and one of which being shown in Fig. 2. From the traveling pulley 176, the cable 170 extends to a pulley 182 rotatably mounted between plates 184 that are rigidly secured to the boom. After passing around the pulley 182, the cable is secured to the frame of the traveling pulley 176, thus completing a compound pulley arrangement that increases the force applied to the cable 170 by a plunger 186 which carries the traveling pulley 176. The plunger 186 is operatively associated with a single acting hydraulic cylinder 188 (Figs. 2, 7–10 and 15) so that sufficient force can be applied to the cable 170 to pivot the hose section D upward about the axis of the swivel joint 122 by admitting hydraulic fluid to the cylinder 188 through its supply line 190 (Fig. 15.)

Since the hose-adjusting cylinder 188 is mounted on the boom E for movement therewith, its supply line 190 is provided with swivel joints 192 and 194 (Fig. 15) that are mounted with their axes aligned, respectively, with the vertical axis W about which the entire unit 22 turns, and the horizontal axis Y about which the boom E swings.

The means for swinging the boom E and the hose sections C and D about the horizontal axis Y include cable guides 200 and 200a, respectively, of channel-shaped cross section (Figs. 2 and 5) and of annular form. The guides are welded to the plates 152 and 152a with their common axis coinciding with that of the bearing members 154 and 154a. Consequently, the guides 200 and 200a serve as reels upon which actuating cables 202 and 202a, respectively, are trained, one end of each cable being secured to the associated reel so that the reel, and with it the boom E, can be rotated about the horizontal axis Y by imposing tension upon the other end of the cable. The two cables 202 and 202a are trained in opposite directions about their respective reels, the cable 202 being adapted to turn the boom E clockwise as viewed in Figs. 1, 2 and 4, whereas the cable 202a is adapted to turn the boom in the opposite direction.

Figure 4:
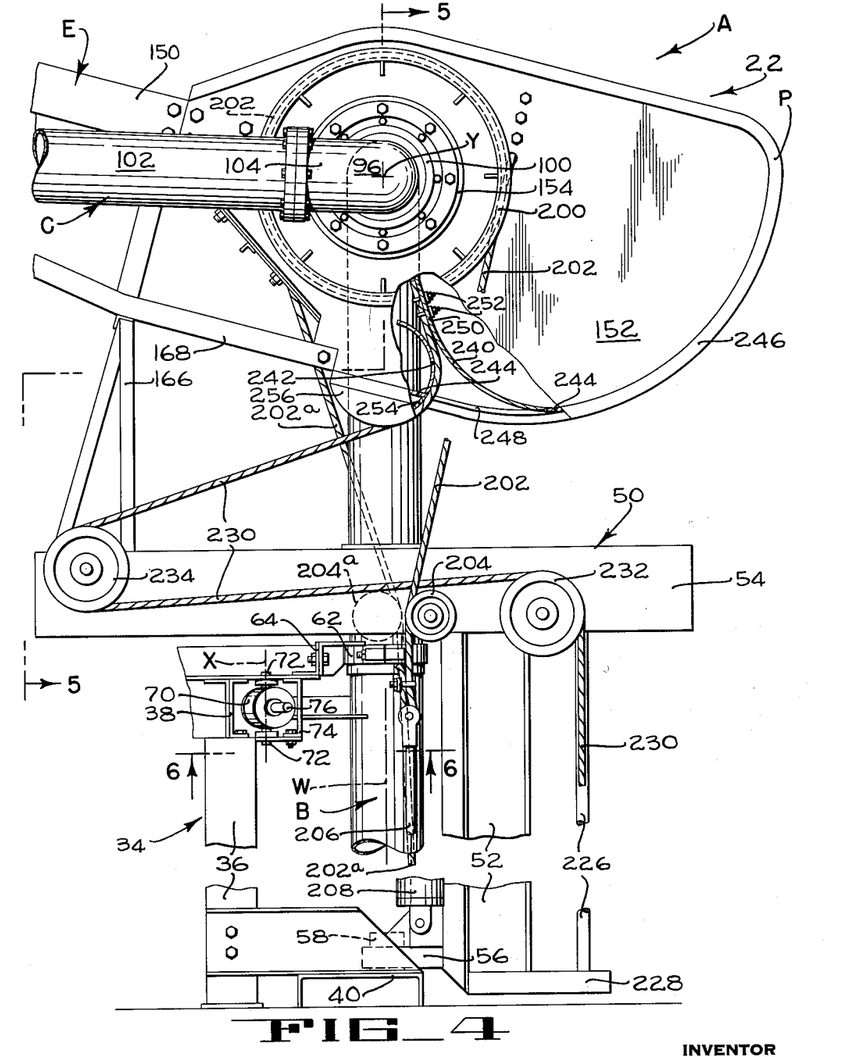
Fig. 4 is an enlarged fragmentary elevation of the unit shown in Figs. 2 and 3, certain portions being broken away.

The cables 202 and 202a extend downward from their respective reels and into guiding engagement with idler sheaves 204 and 204a, respectively, and thence to the upper ends of vertical plunger rods 206 and 206a, respectively (Fig. 3), to which they are firmly secured. The plunger rods 206, 206a are operatively engaged within and extend slidably through the upper ends of hydraulic cylinders 208 and 208a, respectively, the lower ends of which are anchored to the foot plate 56 (Fig. 4) whereby the carriage 50 is supported upon the frame 34. The cylinders 208 and 208a are of the single acting type and, as indicated diagrammatically in Fig. 15, hydraulic lines 210 and 210a communicate with the cylinders 208 and 208a, respectively, adjacent the upper ends thereof. Thus, by connecting the line 210 with a source of hydraulic fluid under suitable pressure and opening the line 210a to permit discharge of fluid from the cylinder 208a, tension is imposed upon the cable 202 by the plunger 206 to turn the boom E clockwise (Figs. 2 and 4). Such movement of the boom winds the other cable 202a onto the reel 200a, raising the plunger 206a within its cylinder 208a. Conversely, by connecting the hydraulic line 210a with the pressure fluid source and by relieving pressure within the line 210, the boom is caused to turn in the opposite direction, and the plunger 206 is raised within its cylinder 208. Since the boom-adjusting cylinders 208 and 208a are mounted on the carriage 50 for movement therewith about the vertical axis W, the hydraulic lines 210 and 210a connected to the cylinders 208 and 208a are provided with swivel joints 212 and 212a, respectively, both of which are mounted with their axes in alignment with the axis W. A bleeder line 216 (Fig. 15) interconnects the lower ends of the two cylinders 208 and 208a, and preferably is provided with an upwardly directed nipple 218 that is open to the atmosphere, to prevent pressure below either plunger 206 or 206a from interfering with operation of the boom E.

The unit 22 includes a counterweight system so designed that it neutralizes or greatly reduces the tendency for the boom E to turn about the horizontal axis Y, regardless of the position of the boom E and the hose A that is partially supported thereby. A counterweight 220 is provided in the form of an appropriate number of metal blocks 222 carried by a hanger 224 that is guided for vertical movement on a rod 226 extending between the forward end of the cross arm 54 and a plate 228 (Figs. 1, 2 and 4) rigid with and projecting forward from the lower end of the stem 52 of the T-shaped carriage 50. The blocks 222 may be shaped to loosely embrace the stem 52 to assist in guiding the counterweight 220. The hanger 224 and the blocks 222 carried thereby are suspended by two cables 230 and 230a (Figs. 2, 4 and 5) from axially aligned sheaves 232 and 232a that are rotatably mounted upon opposite sides of the forward end of the cross arm 54. The cables 230 and 230a are trained around the sheaves 232 and 232a, as well as around axially aligned sheaves 234 and 234a rotatably mounted upon opposite sides of the after end of the cross arm 54.

From the sheaves 234 and 234a, the cables 230 and 230a extend upward and forward to positions closely adjacent the inner faces of the boom plates 152 and 152a, respectively, where they are made fast by means about to be described. The connection of the cable 230 to the plate 152 will be described with the understanding that the cable 230a is similarly connected to plate 152a. The plate 152 (Fig. 4) carries two cable guides 240 and 242, respectively, secured to the inner face of the plate 152. The guide 240 is formed from a suitable length of flat strip stock bent to the desired longitudinal curvature and secured along one edge to the plate 152 projecting laterally therefrom. The region of the guide 240 adjacent one end thereof is disposed substantially radially with relation to the axis Y of rotary movement of the boom plate 152, while the remainder of the guide 240 is deflected counterclockwise, as viewed in Fig. 4, in a curve that merges at the outer end of the guide 240 gradually into the bottom web 244 of a channel-shaped guide 246 (Fig. 5) that is secured to and extends along the peripheral edge of the plate 152.

From the point of convergence of the guide 240 with the web 244 and in a clockwise direction (Fig. 4), the web 244 is slotted as indicated at 248 and the cable 230 extends through the slot 248 thus provided, as best shown in Fig. 4, so that the upper end of the cable 230 can be securely attached to the radially extending part 250 of the guide 240 as by U-bolt clamps 252.

From the point of convergence of the guide 240 with the channel-shaped guide 246, the channel-shaped guide 246 extends counterclockwise (Fig. 4) in a curve gradually increasing in radius to a point P on the periphery of the plate 152 at a maximum radial distance from the axis Y, as best shown in Fig. 4. The curvature of the channel-shaped guide 246 and that of the guide 240 are such that the two cooperate to approximate a volute curve of gradually decreasing radius from the point P in a clockwise direction (Fig. 4) to the radial part 250 of the guide 240.

The guide 242 is formed from a suitable length of flat strip stock bent longitudinally to a substantially arcuate configuration and is secured to the web 244 of the channel guide 246 at the opposite end of the slot 248 from that where the guide 240 is secured, as clearly shown in Fig. 4. The guide 242 projects in both directions from the web 244 and, consequently, is conveniently made from two pieces. That part 254 of the guide 242 which projects outward from the web 244 is provided with auxiliary flanges 256 projecting outward from the lateral edges of the part 254 so as to provide an auxiliary cable guide extending clockwise (Fig. 4) from the slotted portion of the channel guide 246 and projecting radially outward therefrom.

Figure 12:
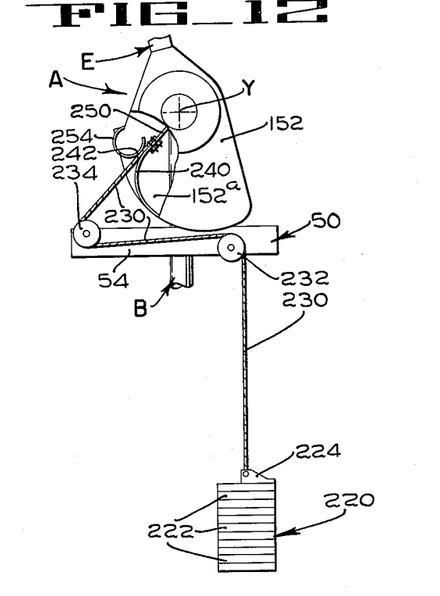

The parts are so proportioned and arranged that when the boom E and the weight supported thereby are in a position of neutral equilibrium, i.e., when the boom slopes rearward but a few degrees from the vertical as indicated in Figs. 2 and 12, the region of the plate 152 with which the radial part 250 of the guide 240 is associated is disposed toward the sheave 234 permitting the cable 230 to extend in a straight line from its point of tangency with the sheave 234 toward the axis Y. It will be understood, therefore, that when the boom E and its load are in the described position of neutral equilibrium, wherein the gravitational forces imposed upon the boom are neutralized and consequently exert no turning moment upon the boom, the cable 230 is incapable of exerting any countertorque upon the boom. As the boom E rotates rearwardly, i.e., counterclockwise from the Fig. 7 position toward the Fig. 2 position, the cable guide 242 engages the cable 230 in a manner producing a progressively greater deflection of the cable as the displacement of the boom from the vertical increases. Consequently, as the boom is displaced progressively further from its position of neutral equilibrium and the turning moment induced by gravity becomes progressively greater, the cable 230 exerts a progressively greater countertorque, thus effectively counterbalancing the boom and its load regardless of how far the boom is displaced rearwardly from its neutral position.

Figure 13:
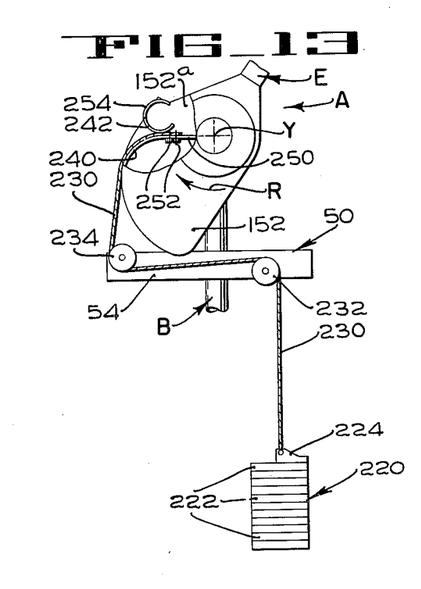
Figure 14:
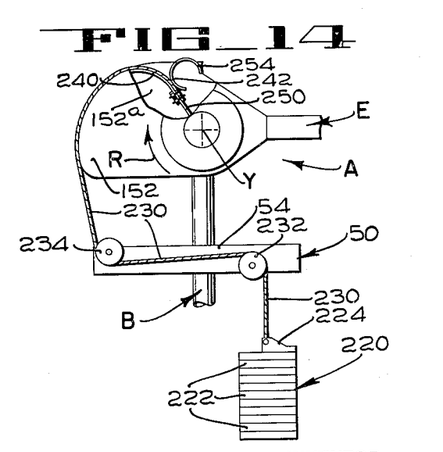

The hose sections C and D are so supported from the boom E that they are maintained in substantially fixed relationship with each other and with the boom E as the boom moves rearwardly from its neutral position to its retracted position illustrated in Fig. 2. Consequently, the center of gravity of the combined boom E and hose sections C and D remains at a constant radial distance from the axis Y as the boom and hose assembly rotates rearwardly from its neutral to its inoperative position. It is apparent therefore, that the force imposed by gravity upon the boom and hose assembly increases regularly as the assembly rotates rearwardly to its inoperative position. The cable guide 242 is designed to increase the countertorque exerted by the cable 230 against the plate 152 at the same rate. When the boom and hose assembly rotate forwardly, however, from their neutral position, i.e., in a clockwise direction (Fig. 12), their center of gravity shifts to a greater distance from the axis Y because the third hose section D is suspended from the outer end of the second hose section C in a manner permitting the angle between the sections C and D to increase as the boom E approaches the horizontal as can best be understood by comparing Figs. 8, 9 and 10. Therefore, the turning moment imposed upon the boom E by its own weight combined with that of the hose sections increases at a faster and an irregular rate than when the boom and hose assembly is turning rearwardly from neutral position, i.e., counterclockwise as viewed in Fig. 12, and this faster rate of increase is compensated for by the volute curvature of the cable guides 240 and 246 upon which the cable 230 winds as the boom rotates forwardly from the vertical, in the direction of arrow R as illustrated in Figs. 13 and 14. As the boom E approaches the horizontal (Fig. 14), the cable 230 makes tangential engagement with the guides 240 and 246 at points spaced progressively farther from the axis Y, as clearly illustrated in Figs. 13 and 14, reaching a maximum when the boom is horizontal (Fig. 14).

Thus, it may be seen that regardless of the position to which the boom E is shifted, the cables 230 and 230a cooperate with the plates 152 and 152a, respectively, in a manner that neutralizes the turning moment imposed upon the boom by its own weight and that of its load.

A control tower 300 (Fig. 1) at one end of the frame 34 provides an operator's station 302 from which an operator can observe all of the units 22 of the apparatus 20. A cluster of four control valves 304, 306, 308 and 310, respectively (illustrated diagrammatically in Fig. 15), are mounted on a panel 312 (Fig. 1) conveniently accessible to an operator at the station 302. As will be explained in the description to follow, the valve 304 is operable prior to operation of the other valves 306, 308, and 310 to prepare the hydraulic circuits associated with the valves 306, 308 and 310 to operate a selected unit 22.

Consequently, each of the valves 306, 308 and 310 is an operating valve, while the valve 304 is a master valve, the operation of which establishes which of the five units 22 will be operated in response to manipulation of the operating valves. Each operating valve 306, 308 and 310 controls corresponding parts of all five units 22, but of only one unit 22 for any one setting of the master valve 304.

All four valves 304, 306, 308 and 310 are of conventional construction whose details do not constitute part of the present invention. Therefore, they are shown only diagrammatically; and since they are of identical design, a description of one will suffice for all. The valve 304 (Fig. 15) comprises a housing 316 provided with a valve chamber 318 within which a closely fitting plunger 320 is reciprocable by means of a manually operable control handle 322 pivotally supported by the housing 316 and operably connected to the plunger 320 by a stem 324 extending slidably through an end of the housing 316. The valve housing 316 is further provided with an inlet port 326 and an outlet passage 328 whose axes lie in the same plane taken transversely through the housing 316. Ports 330 and 332 are provided in the housing 316 and are equally spaced from and on either side of the inlet port 326. The outlet passage 328 instead of entering chamber 318 directly as does the inlet port 326, is bifurcated and communicates with the valve chamber 318 by way of two outlet ports 338 and 340, respectively, the outlet port 338 being in the same transverse plane as the port 330, and the outlet port 340 being in the same transverse plane as the port 332.

When the plunger 320 is in its intermediate position, as illustrated in Fig. 15, the inlet port 326 is blanked off so that no fluid is permitted to enter the valve. The plunger 320 is provided with passages 334 and 336, respectively, of such configuration that when the valve plunger 320 is shifted to the left as viewed in Fig. 15, the passage 336 establishes communication between the inlet port 326 and the port 332, while the passage 334 establishes communication between the port 330 and the outlet port 338. On the other hand, when the plunger 320 is shifted to the right (Fig. 15), the passage 334 establishes communication between the inlet port 326 and the port 330 while the passage 336 establishes communication between the port 332 and the outlet port 340.

The hereinbefore mentioned selector device S includes a selector valve 350 (Figs. 1 and 15) which is controlled by the master valve 304. The selector valve 350 establishes communication between the operating valves 306, 308 and 310 and operating parts of whichever unit 22 is selected for operation. The selector valve 350 comprises an elongate housing 352 defining a cylindrical valve chamber 354 within which a piston 356 is reciprocable. The piston 356 includes a stem 358 and a plurality of discs or flanges rigidly affixed to the stem and fitted to the cylindrical wall of the valve chamber 354 for sliding, fluid-sealing engagement therewith. In effect, therefore, each of the several flanges is a piston head, and all of the piston heads are rigidly interconnected for simultaneous and equal movement within the valve chamber. Of these flanges, those nearest the top and bottom of the housing 352 and indicated at 360 and 362, respectively, operate to move the piston 356 axially of the valve chamber 354. With this function in view, the flanges 360 and 362 are spaced apart on the stem 358 a distance sufficiently less than the axial length of the chamber 354 to permit the desired stroke of the piston 356, and hydraulic lines 364 and 366 are provided leading from the ports 332 and 330, respectively, of the master valve 304 to the upper and lower ends respectively, of the selector valve chamber 354. Hydraulic fluid under pressure is supplied to the master valve 304 by a line 368 leading to the inlet port 326 of the valve 304 from a suitable pump 370 adapted to draw fluid from a reservoir 372 and driven by an electric motor 371 (Fig. 1) constituting part of the power means K. Consequently, the selector valve piston 356 can be moved downward within the valve chamber 354 by moving the handle 322 of the master valve 304 to the left as viewed in Fig. 15. This indexes the passage 336 with the port 332 and the inlet port 326, thus establishing communication between the supply line 368 and the line 364 that leads to the top of the selector valve chamber 354. Thus, the piston 356 is forced downward within the chamber 354 and as this occurs the lower flange 362 forces fluid out of the lower end of the selector valve chamber 354 and through the line 366 to the port 330 of the master valve 304. The plunger 320 of the master valve 304 having been shifted to the left (Fig. 15), its passage 334 registers with the port 330 and with the discharge port 338, thus permitting fluid forced out of the lower end of the chamber 354 to escape through the master valve 304 and to a discharge line 374 that leads from the outlet passage 328 of the master valve 304 to the reservoir 372. When it is desired to adjust the piston 356 upward within the chamber 354 of the selector valve 350 the plunger 320 of the master valve 304 should be shifted to the right (Fig. 15), registering the passage 334 of the plunger 320 with the ports 326 and 330 and registering the passage 336 with the ports 332 and 340. Thus, pressure is supplied from the line 368 through the master valve 304 to the line 366 which conducts fluid to the lower end of the selector valve chamber 354, forcing the piston 356 upward and, consequently, expelling fluid from the top of the chamber 354 through the line 364 and through the port 332, plunger passage 336 and outlet passage 328 of the master valve 304 into the discharge line 374 to the reservoir 372.

When the desired adjustment of the piston 356 of the selector valve 350 has been attained, the handle 322 of the master valve 304 should be returned to its intermediate position wherein the supply line 368 is blanked off, as are likewise both of the ports 330 and 332, to positively maintain the piston 356 of the selector valve 350 in its adjusted position.

An indicator 376 (Fig. 15) mounted preferably on the control panel 312 (Fig. 1) where it is readily observable by an operator at the station 302, enables the operator to keep himself informed as to the adjustment of the selector valve 350. The indicator 376 comprises a dial 378 (Fig. 15) and a pointer 380 movable with relation thereto. The pointer 380 is operably connected by any suitable means 382 to the piston 356 to be moved proportionally therewith, and indicia 384 on the dial are arranged so that the position of the pointer 380 with relation thereto will afford a visual indication of whether the selector valve 350 is in the position of neutral adjustment in which it is diagrammatically shown in Fig. 15, or if it is in a position to route hydraulic fluid to and from one of the units 22 and if so, which particular unit 22.

Development of excessive pressure within the supply line 368 is prevented by means of a relief valve 394, the inlet port of which is connected by a line 396 with the supply line 368. The outlet port of the relief valve 394 communicates by a line 398 with the discharge line 374.

A group 400 of ten equally vertically spaced ports is provided in the selector valve housing 350 at such distance below the upper end of the housing that all of the ports constituting the group 400 are below the level of the upper piston adjusting disc 360 in any possible position of the latter. The ports constituting the group 400 operate in pairs, since the highest two ports in the group, i.e., the ports 402 and 404, respectively, are associated with the hose-maneuvering unit 22a, the two ports immediately below the ports 402 and 404 are associated with the hose-maneuvering unit 22b, and so on through the group 400 of ports, so that one pair of the ports of the group 400 is individual to each of the five hose-maneuvering units 22.

The ports 402 and 404 are connected by the hereinbefore mentioned lines 82 and 84, respectively, to opposite ends of the horizontal cylinder 70 that adjusts the unit 22a horizontally about its vertical axis W, and the other pairs of ports of the group 400 are similarly connected to the corresponding cylinder 70 of the other four hose-maneuvering units 22.

The selector valve 350 is operable to connect the valve 306 optionally to any one of the five horizontal cylinders 70 and thus avoids the necessity of providing a separate control valve for each of the five horizontal cylinders 70. With this object in view, a group 406 of three spaced apart flanges or piston heads is provided, and in cooperation therewith, a single flange 408, all of which are rigid with the valve stem 358. The upper piston-adjusting flange 360 is separated from the group 406 by a space 410 of such length that even when the piston is adjusted to move the group 406 of flanges to its lowest position within the valve chamber, the flange 360 remains above the level of the highest port 402. The spacing between the flanges 406 is the same as that between the ports 400, with the result that when the piston 356 is adjusted to dispose the intermediate flange 406 between the two ports of any of the five pairs of ports of the group 400, the space 412 between the upper and intermediate flanges of the group 406 will be indexed with the upper port of that pair and the space 414 between the intermediate and the lowest flanges of the group 406 will be indexed with the lower port of the pair. A relatively long space 416 is provided between the lowest flange 406 and the single flange 408.

A passage 418 is provided in the stem 358 establishing communication between the spaces 410 and 412 on opposite sides of the upper flange 406, and a similar passage 420 establishes communication between the spaces 414 and 416 on opposite sides of the lowest flange 406. A hydraulic line 422, preferably including a valve 424 that permits unrestricted flow therethrough from the control valve 306 but restricts rate of flow in the opposite direction, is connected at one end to the port 330 of the control valve 306 while a hydraulic line 426, including a valve 428 that operates in the same way as the flow regulating valve 424, is connected to the port 332 of the control valve 306. The other ends of the hydraulic lines 422 and 426 lead into the valve chamber 354 at such locations that they communicate with the spaces 410 and 416, respectively, when the piston 356 is in any position except its illustrated, neutral position. The two hydraulic lines 422 and 426 are interconnected by two by-pass lines 430 and 432 containing relief valves 434 and 436, respectively, so arranged that when hydraulic pressure within either of the lines 422 and 426 exceeds a predetermined value, the excessive pressure will be relieved by escape of fluid through one of the relief valves 434 or 436 to the other line 422 or 426, as the case might be.

The inlet port 326 of the valve 306 is connected by an inlet line 438 with the supply line 368 and the outlet passage 328 of the valve 306 is connected by an exhaust line 440 with the discharge line 374.

Assuming the selector valve 350 to have been adjusted to that position in which it is adapted to route hydraulic fluid to and from the hydraulic mechanisms of hose-maneuvering unit 22a, such adjustment of the selector valve 350 will be shown by alignment of the pointer 380 of the indicator 376 with the indicium 384 associated with the hose-maneuvering unit 22a. The piston 356 of the selector valve 350 will be lowered from the position in which it is illustrated (Fig. 15) to that position wherein the uppermost flange 406 will be immediately below the location where the hydraulic line 422 communicates with the valve chamber 354. The uppermost flange 406 will, however, be above the port 402 with which the hydraulic line 82 leading to the cylinder 70 of the unit 22a communicates. The lowermost flange 406 will be immediately below the port 404 with which the hydraulic line 84 leading to the other end of the cylinder 70 communicates and the intermediate flange 406 will be between the ports 402 and 404. The single flange 408 will have moved to a position immediately below the location at which the hydraulic line 426 communicates with the valve chamber 354.

If, while the selector valve 350 is in the above-described adjusted condition, the handle 322 of the valve 306 is moved to the right as viewed in Fig. 15, the passage 334 of the plunger 320 of the valve 306 will establish communication between the hydraulic supply line 438 and the line 422. This will permit fluid under pressure to enter the space 410 above the group 406 of three flanges, whence the fluid will flow through the passage 418 and the space 412 between the uppermost and the intermediate flanges 406, and through the port 402 and hydraulic line 82 to one end of the cylinder 70 of the hose-maneuvering unit 22a. This will cause the plunger rod 76 of the cylinder 70 to move to the right as viewed in Fig. 15, the effect of which will be to turn the entire hose-maneuvering unit 22a about its vertical axis W and thereby cause the outer end of the boom E to move horizontally. As the plunger rod 72 moves, it will expel hydraulic fluid from the other end of the cylinder 70 through the hydraulic line 84 and the port 404 to the space 414 between the intermediate and lowermost flanges 406. Fluid thus returned to the valve chamber 354 from the cylinder 70 can escape through the passage 420 to the space 416, through the hydraulic line 426, the passage 336 of the valve 306, and the exhaust line 440, and thence to the reservoir 372 by the discharge line 374.

When it is desired to rotate the unit 22a in the opposite direction, the handle 322 of the valve 306 should be moved to the left as viewed in Fig. 15, shifting the plunger 320 so that its passage 336 establishes communication between the supply line 438 and the line 426, and since the selector valve 350 has been adjusted so that its space 416 communicates with the line 426, fluid under pressure will flow from the line 426 through the space 416, passage 420, port 404 and line 84 to the said other end of the cylinder 70 causing the unit 22a to turn in the said opposite direction. As this occurs, fluid is expelled from the cylinder 70 through line 82, port 402, space 412, passage 418, space 410, line 422, passage 334 of the valve 306, and exhaust line 440 to the discharge line 374 which drains into the reservoir 372.

Upon attainment of the desired horizontal adjustment of the unit 22a, the handle 322 of the operating valve 306 should be returned to its intermediate position, wherein the ports 326, 330 and 332 of the valve 306 are closed. Thus, flow of fluid either to or from the horizontal cylinder 70 of the unit 22a is prevented, whereby the unit 22a is effectively locked in its selected position of horizontal adjustment. Nevertheless, the relief valves 434 and 436 prevent damage to the apparatus in the event that an excessive force is exerted against the unit 22a, urging the unit to rotate about its vertical axis W, while the selector valve is still in position to route fluid to and from that unit. For example, the apparatus would, in the absence of such protection, be subjected to considerable damage if the tanker H to which the hose A of the unit 22a is connected should move a short distance along the dock I to which she is moored, and thus force the associated plunger 76 to move within its cylinder 70. In such an event one of the relief valves 434 or 436 will operate to relieve the excessive pressure that builds up within the line 82 or 84, depending upon the direction of such movement of the ship H. The fluid escaping through the relief valve 434 or 436, as the case might be, will flow to the line 426 or 422, respectively, whence it will be routed by the selector valve 350 to the end of the cylinder 70 of the unit 22a in which a partial vacuum would otherwise develop as the result of the movement of the plunger rod 76 in response to fore or aft movement of the tanker H.

It is to be observed that should any of the units 22 be forced to turn about its vertical axis, either while the selector valve is adjuted to route fluid to and from the cylinder 70 of any unit 22 other than the unit 22a, or while the selector valve 350 is in its neutral position, danger of damage resulting therefrom is avoided because the plunger rod 76 of that unit 22 will be free to move within its horizontal cylinder 70. This is because fluid can flow freely from one end of the cylinder 70 to the other since its two hydraulic lines 82 and 84 will be in free communication with each other through the space 416 within the valve housing 352.

Thus it may be seen that adjustment of the selector valve 350 so that the spaces 412 and 414 between the flanges 406 are indexed with the pair of ports 402 and 404 that are associated with the hose-maneuvering unit 22a, enables the operator to effect movement of the unit 22a by means of the control valve 306. When it is desired to effect corresponding movement of any other of the hose-maneuvering units 22, the selector valve 350 should be readjusted to bring the spaces 412 and 414 into register with the pair of ports of the group 400 that are associated with the unit to be moved. Completion of such readjustment will be indicated to the operator by the indicator 376, and will enable the operator to operate the horizontal cylinder 70 of the newly selected unit 22 by appropriate manipulation of the same control valve 306 as that whose operation was explained in the hereinabove description of the operation of the horizontal cylinder of the unit 22a.

A second group 450 of ten ports is provided in the selector valve housing 352 at such spacing below the group 400 that the ports of the group 450 are outside the range of movement of the single flange 408. The ports 450 are spaced apart the same as the ports 400, and are likewise adapted for operation in pairs, since the uppermost pair of ports 450 are connected by the hereinbefore mentioned hydraulic lines 210 and 210a to the cylinders 208 and 208a, respectively, which control movement of the boom E about the horizontal axis Y, the second pair of ports 450 are similarly connected to the corresponding cylinders of the unit 22b, and so on. In other words, each pair of ports 450 is individual to the cylinders 208 and 208a of a particular hose- maneuvering unit 22.

A second group 452 of three flanges is carried by the selector valve piston 356 in such position thereupon that when the inter-flange spaces 412 and 414 are indexed with a pair of ports 400 associated with any one unit 22, the corresponding inter-flange spaces 454 and 456, respectively, of the group 452 are indexed with the pair of ports 450 associated with the same unit 22.

Passages 458 and 460 corresponding to the passages 418 and 420 are provided in association with the flanges 452; and a single flange 462 corresponding to the single flange 408 is provided in a corresponding position on the piston 356.

The control valve 308 is operatively associated with the ports 450 and flanges 452 in the same manner that the valve 306 is associated with the ports 400 and flanges 406, since the ports 330 and 332 of the valve 308 are connected by hydraulic lines 464 and 466, respectively, to the selector valve 350 so that when the selector valve 350 is adjusted to any of its five operating positions, they communicate with the space 465 above the flanges 452 and with the space 467 between the lowermost flange 452 and the single flange 462, respectively. The hydraulic lines 464 and 466 include flow regulating valves 463 and 469, respectively, each of which permits unrestricted flow therethrough from the control valve 308 but restricts flow in the opposite direction. The lines 464 and 466 are interconnected by by-pass lines 470 and 471 containing relief valves 472 and 473, respectively, that correspond and operate similarly to the relief valves 434 and 436. The inlet port 326 of the valve 308 is connected to the supply line 368 by a line 476, and the outlet passage 328 of the valve 308 is connected to the discharge line 374 by a line 478.

A third group 490 of ports is provided in the selector valve housing 352 at such a distance below the ports 450 that the ports 490 are outside the range of movement of the flange 462. The group 490 consists of but five ports and the spacing therebetween is twice that between ports of the groups 400 and 450. The uppermost port 490 is connected by the hereinbefore mentioned hydraulic line 190 to the hose-maneuvering, single acting cylinder 188 on the boom E of the unit 22a, the next lower port 490 is connected by a similar hydraulic line to the corresponding cylinder to the unit 22b, and so on.

A third group of flanges 492, this group consisting of but two flanges defining but a single inter-flange space 494, is carried by the piston 356 in cooperation with the group 490 of ports, being so disposed on the piston that when the interflange spaces 412 and 414 are indexed with the pair of ports 400 associated with a particular unit 22 (at which time the interflange spaces 454 and 456 are indexed with the pair of ports 450 associated with the same unit 22 as hereinabove explained) the inter-flange space 494 will be indexed with the port 490 likewise associated with the same unit 22. A single flange 496 is spaced below the flanges 492 such a distance that when the selector valve piston 356 is in its neutral position, the space 498 between the lowermost flange 492 and the single flange 496 is indexed with all five ports 490 as illustrated in Fig. 15. A passage 500 extending axially of the piston 356 and radially outward at its ends maintains communication between the inter-flange space 494 and the space 502 between the single flange 496 and the lower piston-actuating flange 362.

The port 330 of the operating valve 310 is connected to the space 502 by a hydraulic line 504 which includes a valve 506 that restricts flow in both directions. Since the cylinder 188 is of the single acting type, there is no need for a second hydraulic line leading from the port 332 of the valve 310 and consequently this port is blanked off by a suitable plug 508. The inlet port 326 of the valve 310 is connected by an inlet line 510 to the supply line 368 while the outlet passage 328 of the valve 310 is connected by an exhaust line 512 with the discharge line 374. A by-pass line 514 including a manually adjustable pressure relief valve 516 interconnects the pressure line 504 and the exhaust line 512.

Movement of the handle 322 of the valve 310 to the right as viewed in Fig. 15 causes interconnection of the valve's ports 326 and 330, so that hydraulic fluid under pressure is supplied from the inlet line 510 and through the line 504, space 502, passage 500, and inter-flange space 494 to one of the five ports 490 to actuate the hose-maneuvering cylinder 188 and plunger 186 of a particular unit 22, depending upon the pre-arranged adjustment of the selector valve 350. A bleeder outlet 517 (Fig. 15) in the lower end of the cylinder 188 prevents building up of pressure within the cylinder that otherwise might interfere with its proper operation. Return of the handle 322 of the valve 310 to its neutral position will close the ports 326 and 330 thereof, blanking off the line 504 and thereby locking the plunger 186 of the selected cylinder 188 and the hose section D connected thereto in their adjusted position provided the outer hose section D is not subjected to any excessive load while the line 504 is thus blanked off. In the event that the hose section D is forced to move against the tension of the cable 170 while the line 504 is blanked off, the relief valve 516 will operate to prevent excessive presure from building up within the lines 504 and 190 the associated port of the selector valve 350, and the cylinder 188. Movement of the handle 322 of the valve 310 to the left (Fig. 15) will connect the line 504 to the exhaust line 512, permitting fluid to be expelled from the selected cylinder 188 and thus enabling the associated hose section D to return by its own weight to a position wherein it hangs vertically from the outer end of the associated hose section C.

In the event that the cylinder 188 and plunger 186 of any unit 22 are actuated to displace the associated hose section D from its vertical position and the selector valve 350 is adjusted to remove the inter-flange space 494 from registration with the port 490 associated with the displaced hose section D, that hose section will not be able to return by gravity to its vertical position because the said port 490 will be in communication with either the space 502 below the single flange 496 or the space 518 immediately above the group 492 of flanges. Full operating pressure is maintained in both spaces 518 and 502 by a manually adjustable relief valve 520 within an exhaust line 522 that leads into the discharge line 374 from two ports 524 and 526 in the selector valve housing 352. The ports 524 and 526 are so arranged that either the space 498 or the space 518 is at all times in communication with the exhaust line 522, regardless of whether the flanges are above or below the upper port 524, so that all ports 490 except that with which the space 494 might be indexed at any given time are enabled to discharge fluid from their several associated cylinders 188 through the relief valve 520 if and when the pressure therewithin exceeds that for which the relief valve 520 is set.

It will be understood, therefore, that at the time that the selector valve 350 is adjusted to establish operating connection between the operating valve 306 and the horizontal cylinder 70 of a particular hose-maneuvering unit 22, operating connections are established at the same time between the operating valve 308 and the boom-adjusting cylinders 208 and 208a of the same unit 22, and likewise between the operating valve 310 and the hose-manipulating cylinder 188 of the same unit.

Operation

In describing the operation of the apparatus 20 of the present invention, it will be asumed that a tanker H (Figs. 7–10) has been moored to the dock I and that an operator at the operator's station 302 (Fig. 1) is informed as to the particular type of fluid that is to be pumped into or out of the ship's tank with which the conduit G communicates. It is likewise assumed that the operator is aware of which unit 22 is adapted to handle that particular fluid by having its conduit F (Figs. 2 and 7–10) connected to a storage tank (not shown) for the fluid.

The initial step in the operation of the apparatus 20 of the invention is to connect the motor 371 (Fig. 1) to a suitable source of electric energy to actuate the pump 370 (Fig. 15) and thereby cause working pressure to be developed within the supply line 368 that leads to the inlet ports 326 of the three operating valves 306, 308 and 310 as well as to the inlet port 326 of the master valve 304. Manipulation of the handle 322 of the master valve 304 in the manner explained hereinabove will enable the operator to adjust the selector valve 350 to bring the pointer 380 of the indicator 376 into alignment with the indicium 384 associated with the unit 22 intended to be operated. This will show that the valve 306, 308 and 310, respectively, have been operatively connected to the apparatus for turning the selected unit 22 horizontally, the apparatus for swinging its boom E vertically, and the apparatus for swinging its outer hose section D upward and outward about the axis Z (Figs. 2 and 7–10) of its pivotal connection to the intermediate hose section C. The operator should then return the handle 322 of the master valve 304 to its intermediate position to lock the selector valve piston 356 in its adjusted position.

Figure 9:
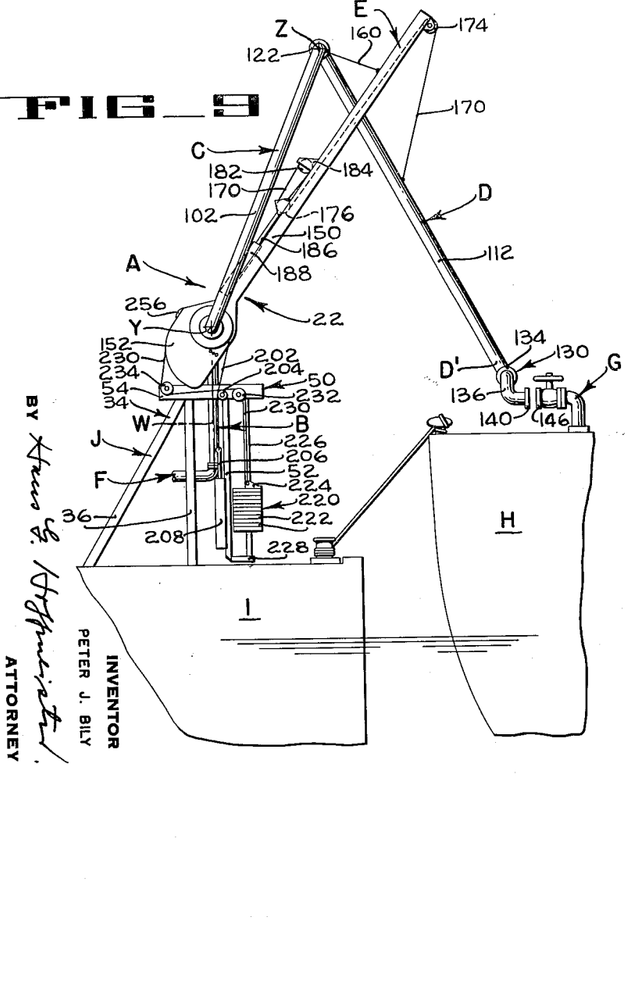
Figure 10:
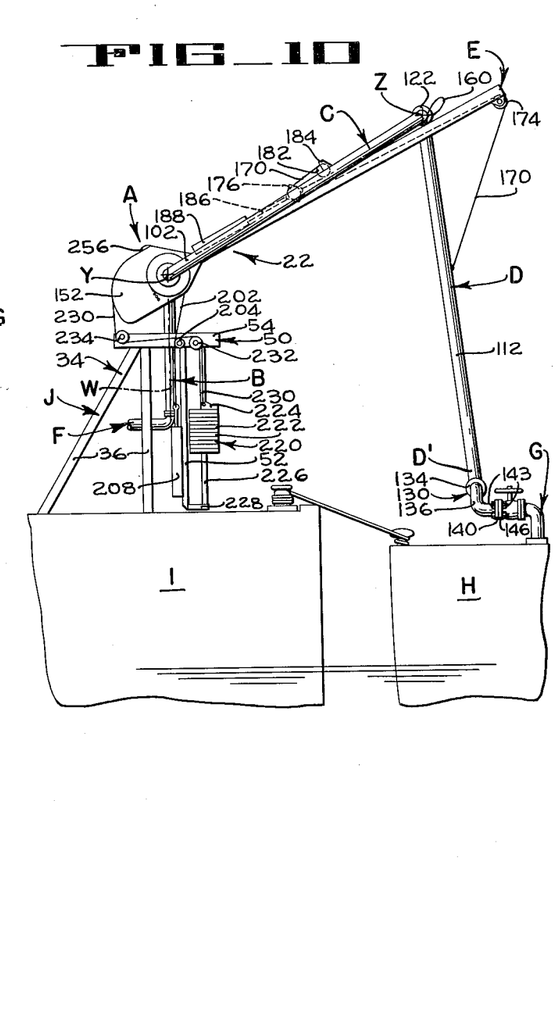
Figure 11:
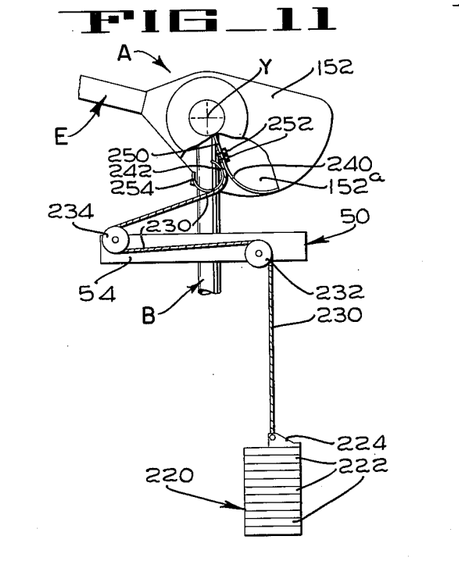
Figs. 11 to 14, inclusive, are diagrammatic views showing the counterbalancing mechanisms in successive positions assumed thereby as the fluid-conveying unit moves from inoperative to operative position.

The selected boom E should then be swung outward, i.e., clockwise as viewed in Fig. 2, from its retracted, inoperative position in which it is shown in that figure to a projected or operative position such as that shown in Fig. 9. This is accomplished by shifting the handle 322 (Fig. 15) of the control valve 308 to the right to connect the fluid supply line 368 to the cylinder 208 of the selected unit 22 and to connect the companion cylinder 208a to the reservoir 372, as explained in detail hereinabove. Pressure of the fluid thus supplied to the cylinder 208 will force the plunger rod 206 downward into the cylinder 208, imposing tension on the associated cable 202 (Figs. 2, 3, 4 and 5) so as to rotate the cable guide 200 and with it the plates 152 and 152a and the boom E of the selected unit 22. The companion cable guide 200a will likewise rotate, winding the associated cable 202a thereupon, and pulling upward the plunger rod 206a to which it is secured, this being made possible by the above mentioned connection of the cylinder 208a to the reservoir 372 through the control valve 306.

Figure 7:
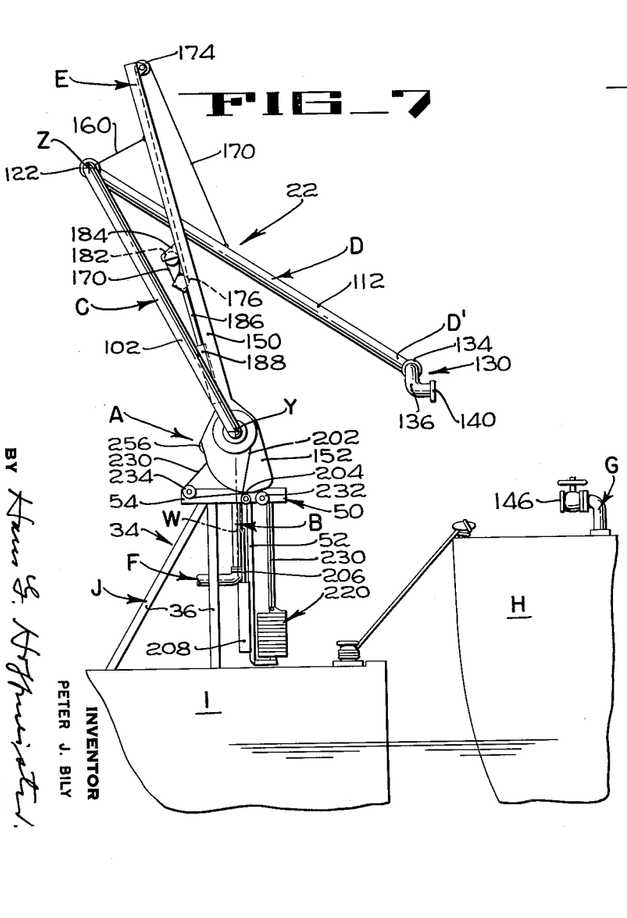
Figs. 7 to 10, inclusive, are diagrammatic views illustrating the fluid conveying unit of Figs. 2 and 3 in successive positions of movement from retracted or inoperative to operative position.
Figure 8:
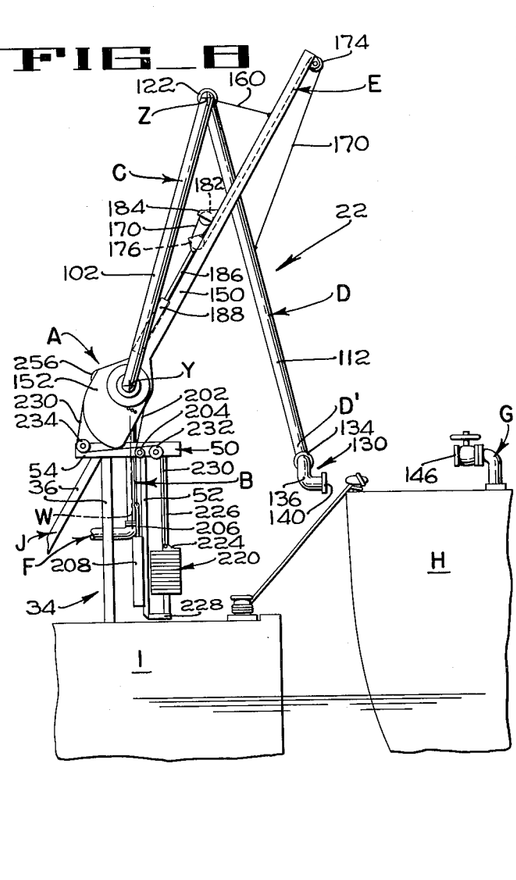

It is apparent, therefore, that the described manipulation of the control valve 308 will cause the boom E and the hose sections C and D of the selected unit 22 to swing outward in a vertical plane and about the horizontal axis Y from the position illustrated in Fig. 2 and successively through those indicated in Figs. 7 and 8. Such movement of the boom and hose sections progresses smoothly and easily since the configuration of the cable guides 240, 242 and 246 (Fig. 4) is such that the boom E and hose sections C and D are substantially counterbalanced in all positions thereof, as hereinbefore explained.

When the boom E has been swung far enough to dispose the flange 140 at the distal end D' of the hose A approximately in horizontal alignment with the deck flange 146 to which it is to be secured, as indicated in Fig. 8, vertical swinging of the boom E should be arrested by returning the handle 322 of the valve 308 to its intermediate position. The valve 310 should then be employed to release fluid to the cylinder 188 on the boom E, retracting the plunger 186 thereof, and thereby so tensioning the cable 170 that the outer pipe section D is swung outward to dispose the hose flange 140 closely adjacent the deck flange 146, as indicated in Fig. 9. Since the pipe section D swings upward slightly as it pivots outward about the axis Z, it may be necessary to further lower the boom E in order to attain accurate alignment of the flanges 140 and 146. Furthermore, it may be that the tanker H has been moored so that the deck flange 146 is not in exact transverse alignment with the flange 140. Unless such misalignment is excessive, it can be compensated for by operating the valve 306 to feed hydraulic fluid to the horizontal cylinder 70 of the selected unit 22, causing the outer end of the hose A to move either forward or aft, as circumstances may require.

The flange 140 at the outer end of the hose A of the selected unit 22 can be disposed so closely adjacent the deck flange 146 that it is an easy matter to bolt them together. In this manner, the conduit F on the dock is coupled to the conduit G on the ship (Fig. 10) so that pumping can be commenced to load or unload the tanker.

When coupling of the flanges 140 and 146 has been completed, the unit 22 can be left in its projected position so as to permit pumping through the pipe line that has been connected up to proceed while a second unit 22 of the apparatus 20 is maneuvered to place its hose A likewise in operation, provided the tanker H is equipped to accommodate a second loading or unloading connection. This necessitates adjustment of the selector valve 350 by means of the master valve 304 to establish connection between the control valves 306, 308 and 310 and the horizontal cylinder 70, the vertical cylinders 208 and 208a, and the boom-supported cylinder 188, respectively, of the second unit 22. When the selector valve 350 is thus readjusted, the second unit 22 can be maneuvered similarly to the manner of operation of the first unit. If desired, this procedure can be continued until the hoses A of all five units 22 are coupled and in operating condition, provided, of course, a sufficient number of deck flanges 146 are available to accommodate them.

It will be appreciated, therefore, that a lone operator at the station 302 (Fig. 1) atop the tower 300 can, by appropriate manipulation of the valves 304, 306, 308 and 310, maneuver any or all of the five units 22 from their retracted, inoperative positions (Fig. 2) to their projected or operative positions such as that indicated in Fig. 9 so that the hose flanges 140 can rapidly and with minimum effort be engaged with and secured to the deck flanges 146. Pumping can then be commenced to load or unload the tank or tanks with which the connected conduits G communicate.

Upon completion of the operation of loading or unloading, as the case might be, the hose or hoses A that have been employed should be returned to their inoperative, or retracted position (Fig. 2) by a reversal of the above described procedure.

At all times that the equipment is operated, it is under the complete and accurate control of the operator, so that motion of the parts in any direction can immediately be arrested, reversed or resumed. Consequently, the operator is enabled to meet any emergency that might arise so as to avoid accidents that otherwise would be apt to cause injury to personnel or property. Moreover, the apparatus of the invention makes it possible to adjust the boom E and hose A of each unit 22 with such precision as to dispense with practically all the heavy lifting and carrying that characterize any job of connecting up tanker loading and unloading hoses of the conventional type.

If any of the moving parts of the apparatus should encounter an obstruction while the unit to which it belongs is being maneuvered, danger of damage to either the apparatus or to the object forming the obstruction is minimized by the design and arrangement of the apparatus of the invention. In the first place, the necessity of applying forces of great magnitude to the apparatus to effect movement thereof is eliminated by the presence of the counterweight 220 in association with each unit 22 and the manner in which its force is applied to the boom plates 152 and 152a so as to maintain the boom E and the load supported thereby in a condition of substantially neutral equilibrium in all positions. Therefore, even if the boom E or some other moving part of the apparatus should encounter a stationary object, such as a part of the ship's rigging, the force which the moving part of the apparatus will exert against the obstruction will be relatively slight. Moreover, even if the valve 306, 308 or 310, as the case might be, by which movement of the obstructed part of the apparatus is controlled, remains open while the pump 370 continues to operate, pressure will not build up within the hydraulic lines to an extent apt to result in damage to either the apparatus of the invention or to the obstructing object, because the relief valve 394 in the line 396, 398 will operate to prevent any excessive pressure from building up within the hydraulic system, regardless of the position occupied by the piston 356 of the control valve 350.

If relative motion should occur between the conduit G on the tanker H and the conduit F of a unit 22 while the conduits are interconnected by the articulated hose A of the unit, the apparatus is capable of adapting itself to the relative movement so as to avoid damage to the apparatus. For example, if the relative motion be such as that resulting from movement of the ship H parallel to the dock I, the plunger rod 76 of the involved unit 22 will be forced to move within its cylinder 70, causing fluid to be expelled from one end of the cylinder and the creation of a partial vacuum in the other end of the cylinder. If, when such movement occurs, the involved unit is hydraulically coupled to the operating valves (i.e., the selector valve 350 is in condition to route fluid to and from the hydraulic cylinders 70, 208, 208a and 188 of the involved unit 22) pressure tending to build up within one end of the cylinder 70 will be relieved by the relief valve 434 or 436, depending upon the direction of movement of the plunger rod 76, and the fluid released by the relief valve will relieve the partial vacuum developed in the other end of the cylinder. On the other hand, if a unit 22 is not hydraulically coupled to the operating valves 306, 308 and 310 when the associated plunger rod 76 is forced to move within its cylinder 70 in response to movement of the ship H along the dock I, no material pressure differential will develop within the cylinder 70 since both ends thereof are in unrestricted communication through the space 416 within the selector valve 350.

Relative motion between the conduits F and G in a vertical direction, such as that occurring as the result of change in the tide or change in the extent to which the ship's tanks are filled, is similarly compensated for by the relief valve 472 or 473, depending upon whether the motion of the ship is up or down, if the involved unit is hydraulically coupled to the operating valves 306, 308 and 310. When the unit is not coupled to the operating valves, pressure differential between the two cylinders 208 and 208a is prevented from developing by flow from one cylinder through the selector valve space 467 and directly to the companion cylinder. It should be observed that this feature not only protects the apparatus 20 from physical injury when excessive mechanical force is applied to a boom E, but the cables 202 and 202a are prevented from becoming dangerously slack, because when one plunger rod 206 or 206a is pulled upward as a consequence of pivotal movement of the boom E, fluid displaced from the associated cylinder will flow to the companion cylinder, pulling the plunger thereof downward and thereby taking up the slack that would otherwise develop in the associated cable 202 or 202a, as it unwinds from the cable guide 200 or 200a, respectively.

Drifting of the ship H away from the dock I while a hose A is connected to a deck flange 146, causing the outer hose section D to swing outward about the horizontal axis Z at the outer end of the intermediate hose section C, will have no effect upon the apparatus other than to develop slack in the cable 170. Movement of the ship toward the dock, however, while a hose A is connected to a deck flange 146 and when there is no slack in the cable 170, will cause the associated plunger 186 to be pulled outward of its boom cylinder 188, expelling fluid through the line 190. If the selector valve 350 is so adjusted that the involved unit 22 is coupled to the operating valves when such movement of the ship occurs, the relief valve 516 will operate to prevent development of excessive pressure within the associated parts of the hydraulic system; whereas if the unit 22 is not hydraulically coupled, the relief valve 520 will operate to prevent injury to the apparatus by excessive pressure within the associated parts of the hydraulic system.

While a preferred apparatus for carrying out the invention has been shown and described, it will be understood that it is capable of modification and variation while still employing the principles of the invention. It is to be understood, therefore, that the scope of the invention should be limited only by the scope and proper interpretation of the claims appended hereto.

Having thus described the invention, that which is believed to be new and for which protection by Letters Patent is desired, is:

1. Apparatus for establishing fluid conveying communication between fluid delivering and fluid receiving means, comprising a fluid tight hose connected at one end to the fluid delivering means, means mounted for movement in a vertical plane for supporting the hose and for moving the hose toward and away from the fluid receiving means, and means carried by the hose moving means and operable to maneuver the other end of the hose to a position adjacent said fluid receiving means.

2. Apparatus for establishing fluid conveying communication between separate fluid handling means, comprising a fluid tight hose communicating at one end with one of said fluid handling means, means mounted for movement in a vertical plane for supporting the hose and for moving the hose toward and away from another of said fluid handling means, and means carried by the hose moving means and operable to maneuver the other end of the hose to a position adjacent said other fluid handling means.

3. Apparatus for establishing fluid conveying connection between two conduits, comprising a fluid tight hose connected at one end to one of the conduits, hose carrying means mounted adjacent one of the conduits and movable in a vertical plane toward and away from the other conduit, means supporting the hose on the hose carrying means for movement therewith, and means carried by the hose carrying means and operable to maneuver the other end of the hose to a position adjacent said other conduit for connection of said other end of the hose to said other conduit.

4. Apparatus for establishing fluid conveying connection between two conduits, comprising a fluid tight hose connected at one end to one of the conduits, a boom mounted adjacent one of the conduits for pivotal movement about a horizontal axis toward and away from the other conduit, means connecting the hose to the boom to be moved thereby, means carried by the boom and operable to maneuver the other end of the hose to a position adjacent said other conduit, and means for releasably coupling said other end of the hose to said other conduit.

5. Apparatus for establishing fluid-conveying interconnection between two conduits, comprising a fluid-tight hose including at least two rigid sections and a swivel pipe joint pivotally interconnecting said two sections, means coupling one of said sections to one of said conduits, a boom mounted adjacent said one conduit for pivotal movement about a horizontal axis from a retracted position to a projected position, means connecting the hose to the boom for movement therewith, and further means interconnecting the boom and a part of the hose spaced from said connecting means and operable to maneuver the other of said sections to a position adjacent the other conduit.

6. Apparaus for interconnecting a fixed conduit and a portable conduit temporarily disposed within the vicinity of the fixed conduit, comprising a boom mounted adjacent said fixed conduit and for movement from a retracted position toward the other conduit, a fluid-conducting hose including a plurality of rigid tubing sections and a swivel pipe coupling pivotally interconnecting adjacent sections, one of said sections being connected to said fixed conduit, means connecting one of said sections to said boom for support thereby, releasable coupling means carried by another of the sections, and means adjustably interconnecting the boom and said last mentioned section for maneuvering said coupling means into position adjacent the portable conduit.

7. Apparatus for interconnecting fluid handling means on a dock and fluid handling means on a ship adjacent the dock, comprising a boom pivotally mounted on the dock for movement about a horizontal axis to a position retracted from the ship or to a position projected toward the ship, means for moving the boom to either of said positions, a fluid tight hose connected at one end to said fluid handling means on the dock, means arranged to support the hose from the boom for movement therewith, and means operatively associated with the boom independently of said hose supporting means and operable when the boom is in said projected position for maneuvering the other end of the hose to a position adjacent said fluid handling means on the ship.

8. Apparatus for establishing fluid conveying connection between two conduits, comprising a hose connected at one end to one of the conduits, a boom mounted adjacent one of the conduits and for pivotal movement about a horizontal axis toward and away from the other conduit, means connecting the hose to the boom for support thereby, means for counterbalancing the boom and the hose including a weight and means for applying the gravitational force thereof to the boom eccentrically with relation to said axis and at a radial distance from the axis that varies as the center of gravity of the boom and hose alters its horizontal distance from the axis, means carried by the boom and operable to maneuver said other end of the hose to a position adjacent said other conduit, and means for releasably coupling the other end of the hose to said other conduit.

9. Apparatus for interconnecting a first conduit on a dock and a second conduit on a ship adjacent the dock, comprising a hose assembly including a plurality of pivotally interconnected rigid tubes, a boom movable to a position retracted from the ship or to a position projected toward the ship, means suspending one of the tubes from the boom, means for moving the boom to either of said positions, means carried by the boom independently of said suspending means and operable when the boom is in said projected position for maneuvering the lower end of the suspended tube to a position adjacent said second conduit, and means for releasably coupling said lower end of the suspended tube to said second conduit.

10. Apparatus for establishing fluid-conveying interconnection between two relatively movable conduits, comprising a hose connected at one end to one of the conduits, movably mounted means supporting said hose for carrying the same into a position adjacent the other conduit, coupling means for connecting the other end of the hose to said other conduit, power means for moving the hose carrying means, and yieldable means interposed between the hose carrying means and the moving means to limit to a predetermined magnitude the force that either can exert against the other whereby the hose carrying means is enabled to adapt itself to movement of one conduit relative to the other without correspondingly affecting the moving means.

11. Apparatus for establishing fluid-conveying interconnection between two relatively movable conduits, comprising a hose conneced at one end to one of the conduits, movably mounted hose supporting means for carrying the hose into a position for engagement with the other conduit, hydraulic means for moving the hose carrying means, a source of hydraulic fluid under pressure, a hydraulic line connecting said source to said hydraulic means to actuate the carrying means and to immobilize the carrying means with said hose in said conduit engaging position, coupling means for engaging the hose with said other conduit, and a relief valve interposed in said hydraulic line to enable the carrying means to adapt itself to movement of said conduits with respect to each other while the hydraulic means is connected to the pressure source.

12. Apparatus for establishing fluid conveying interconnection between two relatively movable conduits, comprising a hose connected at one end to one of said conduits, a boom supporting said hose and mounted for movement toward and away from the other conduit, a hydraulic engine operably connected to the boom for moving the same, a hydraulic engine carried by the boom and operably connected to the other end of the hose for maneuvering said other end into position for engagement with the other of said conduits, means for engaging said other end of the hose with said other conduit, a source of hydraulic fluid under pressure, two hydraulic lines, each connecting one of said hydraulic engines to said fluid pressure source, and two relief valves, one interposed in each of said hydraulic lines to permit escape of fluid therefrom to compensate for reverse operation of the associated engine in response to motion of said conduits with respect to each other.

13. Apparatus for establishing connection between two relatively movable conduits, comprising a boom mounted for universal pivotal movement, a hydraulic engine connected to the boom for turning the same about a vertical axis, a hydraulic engine connected to the boom for turning the same about a horizontal axis, a hose supported from the boom and connected at one end to one of said conduits, a hydraulic engine connected to the hose adjacent the other end thereof for maneuvering said other end into position for engagement with the other of said conduits, a source of hydraulic fluid under pressure, a hydraulic line associated with each of said engines and connecting the same with said source of fluid pressure, and a relief valve in each of said hydraulic lines for relieving excess pressure therein to compensate for reverse operation of the associated engine in response to movement of one of the conduits with relation to the other while said hose is connected to said other conduit.

14. Apparatus for connecting a portable conduit to a conduit selected from a plurality of stationary conduits, comprising a hose connected to each of said stationary conduits, a plurality of movably mounted hose carriers, means connecting each hose to one of said carriers to be supported thereby, hydraulic means for moving each of said carriers, hydraulic means mounted on each carrier and operatively connected to the associated hose for maneuvering the same relatively to the carrier, a carrier controlling valve, a hose maneuvering valve, means supplying hydraulic fluid under pressure to said valves, and means for selectively connecting said carrier controlling valve and said hose maneuvering valve, respectively, to the carrier moving means and the hose maneuvering means of only one hose carrier at a time to prepare the selected carrier and hose for movement in response to operation of the valves.

15. Apparatus for connecting one conduit selected from a plurality of stationary conduits to a conduit movable with respect thereto, comprising a plurality of individually operable connecting units, each including a hose connected at one end to one of said stationary conduits, a boom supporting the hose and mounted for movement toward and away from said movable conduit, and a hydraulic engine operably connected to the boom to move the same, a source of hydraulic fluid under pressure, a manually operable valve connected to said source of fluid under pressure, a hydraulic line leading to each of said engines, and a selector valve for connecting said manually operable valve to a selected one of said hydraulic lines.

16. Apparatus for connecting a selected one of a plurality of conduits on a dock to a conduit on a vehicle temporarily disposed adjacent the dock, comprising a plurality of individually operable connecting units, each including a hose connected at one end to one of the conduits on the dock, a boom supporting the hose and mounted for universal pivotal movement, a hydraulic engine operably connected to the boom for moving the boom about a vertical axis, and a hydraulic engine operably connected to the boom for moving the boom about a horizontal axis, a source of hydraulic fluid under pressure, two manually operable valves connected to said source to receive fluid under pressure therefrom, and selectively operable means for connecting said valves to the hydraulic engines of only a single unit to prepare a selected unit for operation by said valves.

17. Apparatus for connecting a selected one of a plurality of conduits on a dock to a conduit on a vehicle temporarily disposed adjacent the dock, comprising a plurality of individually operable connecting units, each including a hose connected at one end to one of the conduits on the dock, a boom supporting the hose and mounted for universal pivotal movement, a hydraulic engine operably connected to the boom for moving the boom about a vertical axis, a hydraulic engine operably connected to the boom for moving the boom about a horizontal axis, and a hydraulic engine operably connected to the hose adjacent the other end thereof for maneuvering said other end of the hose, three individually operable control valves, means for supplying hydraulic fluid under pressure to said valves, and means for selectively connecting said valves to the hydraulic engines of only a single unit to prepare the selected unit for operation by said valves.

18. Apparatus for selectively coupling a fluid container on a fluid transporting vehicle to one of a plurality of fluid containers at a fluid handling station, comprising a plurality of flexible conduits, each of said containers at said station having one of said conduits coupled thereto, a plurality of booms mounted for movement individually from a retracted position at said station to a projected position adjacent the vehicle, means associated with each of the conduits connecting the same to one of the booms to be carried thereby to a position adjacent the container on the vehicle, means associated with each conduit adjustably connecting the outer end thereof to the respective boom, means associated with each conduit for releasably coupling the conduit to the container on the vehicle, and means for selectively moving said booms.

19. Apparatus for coupling a portable fluid container selectively to one of a plurality of stationary fluid containers, comprising a plurality of flexible conduits, each of said conduits being coupled to one of the stationary containers, a plurality of booms mounted for movement individually from a retracted position to a projected position, each of the conduits being supported by one of the booms to be carried thereby into a position adjacent the portable container, means associated with each boom for moving the same, a single control means common to all of said boom moving means, and means for selectively connecting said control means to one of said boom moving means.

20. Apparatus for coupling a first fluid container to a second fluid container selected from a group of fluid containers, comprising a plurality of flexible conduits corresponding in number to the number of containers in said group of containers, each of said containers of said group of containers having one of said conduits coupled thereto, a plurality of conduit carrying means corresponding in number to the number of said conduits, each of said conduit carrying means being mounted for movement independently of the other conduit carrying means, a power drive operably connected to each of said conduit carrying means for moving the same, each of said conduits being supported by its respective conduit carrying means to be carried thereby into a position adjacent said first container, means for connecting the first container to a conduit moved to said position, a single control device common to all of said power drives, and a selector device arranged to operably connect said control device to any selected one of said power drives.

21. Apparatus for establishing fluid conveying communication between spaced apart fluid handling means, comprising a conduit connected at one of its ends to one of said fluid handling means, a boom supporting an intermediate part of the conduit, said boom being pivotally mounted adjacent said one of the fluid handling means for pivotal movement about a horizontal axis, means for pivoting the boom about said axis to move the conduit toward and away from the other of the fluid handling means, said conduit including a flexible part and the part of the conduit between its other end and said flexible part being rigid, releasable coupling means carried by the conduit at said other end thereof for attaching the same to said other fluid handling means, and means carried by the boom and connected to said rigid part of the conduit for projecting said other end of the conduit beyond the reach of the boom by pivoting the rigid part of the conduit relatively to the flexible part thereof.

22. Apparatus for establishing fluid conveying communication between spaced apart fluid handling means, comprising a conduit connected at one of its ends to one of said fluid handling means, a boom supporting an intermediate part of the conduit, said boom being pivotally mounted adjacent said one fluid handling means for pivotal movement about a horizontal axis, means for turning the boom about said axis to move the conduit toward and away from the other fluid handling means, releasable coupling means carried by the conduit at the other end thereof for attaching the same to the other of said fluid handling means, and means carried by the boom and connected to the conduit for projecting said other end of the conduit beyond the reach of the boom by pivoting said other end of the conduit relatively to said intermediate part.

23. Apparatus for establishing fluid conveying communication between fluid delivering and fluid receiving means, comprising a liquid tight conduit connected at one end to the fluid delivering means, conduit carrying means mounted for movement in a vertical plane and in a horizontal plane, and means carried by the conduit carrying means and operable to move the other end of the conduit to a position adjacent said fluid receiving means, the two last mentioned means being conjointly operable to effect universal movement of said other end of the hose with respect to said fluid receiving means.

24. Apparatus for establishing liquid conveying communication between separate fluid handling means comprising a liquid tight conduit communicating at one end with one of said fluid handling means, means mounted for movement in a vertical plane and for movement in a horizontal plane for moving the hose toward and away from the other of said fluid handling means, and power actuated means carried by said conduit moving means and connected to the other end of the conduit, said power actuated means being operable to move said other end of the conduit to a position adjacent said other fluid handling means, said conduit moving means and said power actuated means being operable in cooperation with each other to effect universal movement of said other end of the conduit relatively to said other fluid handling means.

References Cited in the file of this patent
UNITED STATES PATENTS

| | | |
|---|---|---|
| 1,429,262 | Wertz | Sept. 19, 1922 |
| 1,680,831 | White | Aug. 14, 1928 |
| 1,814,618 | Carter | July 14, 1931 |
| 2,090,136 | McKee | Aug. 17, 1937 |
| 2,160,683 | Spaeth | May 30, 1939 |
| 2,557,358 | Martinson | June 19, 1951 |
| 2,697,442 | Anschutz | Dec. 21, 1954 |
| 2,719,653 | Bledsoe | Oct. 4, 1955 |